June 24, 1958  J. VANDER TUIN ET AL  2,840,237
MACHINE FOR SORTING RECORD FORMS
Filed Dec. 21, 1953  9 Sheets-Sheet 1
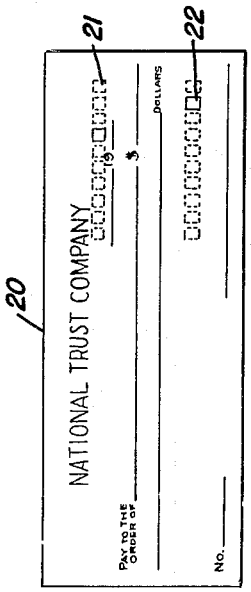
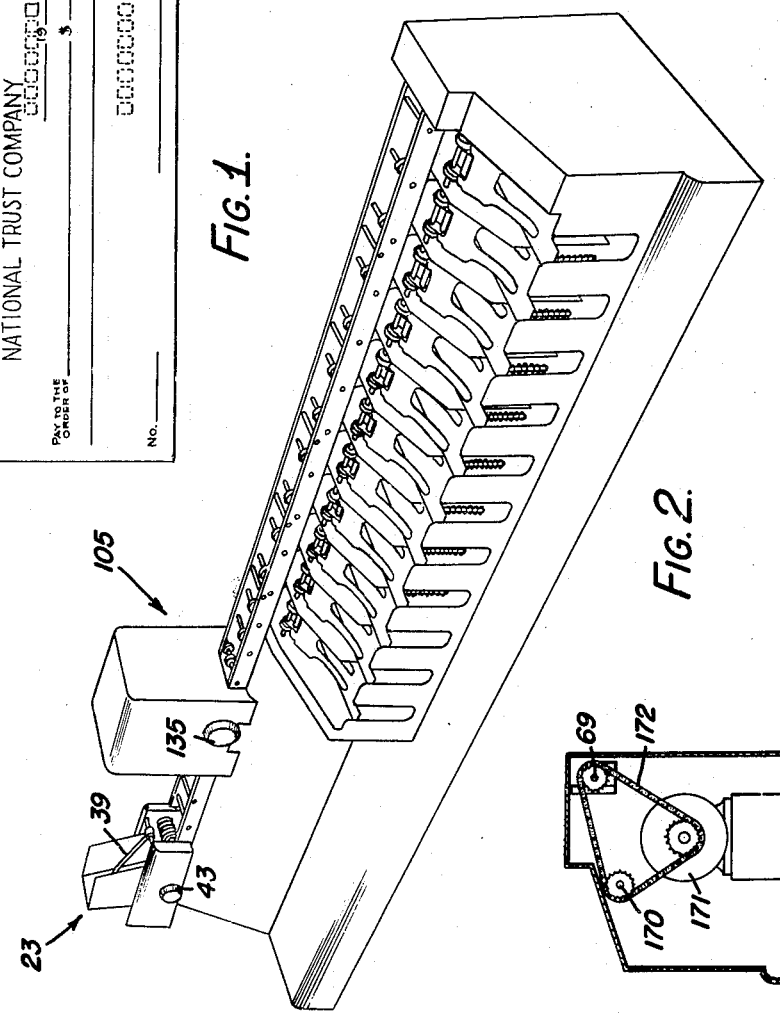
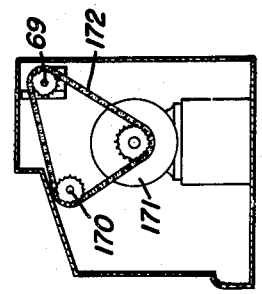
INVENTOR.
JOHN VANDERTUIN
AND WALTER B. PAYNE
BY
THEIR ATTORNEY

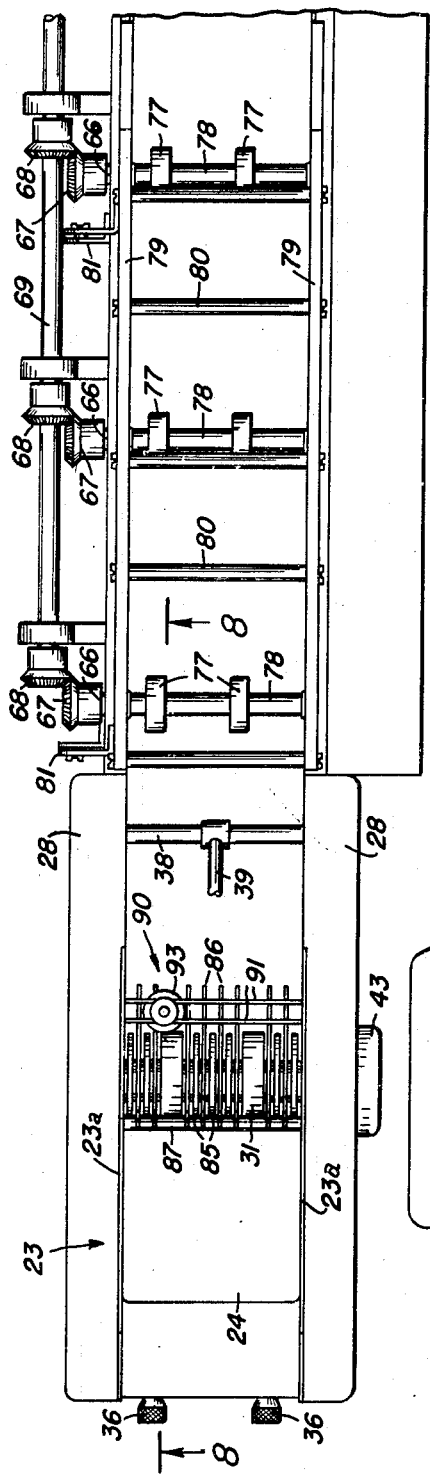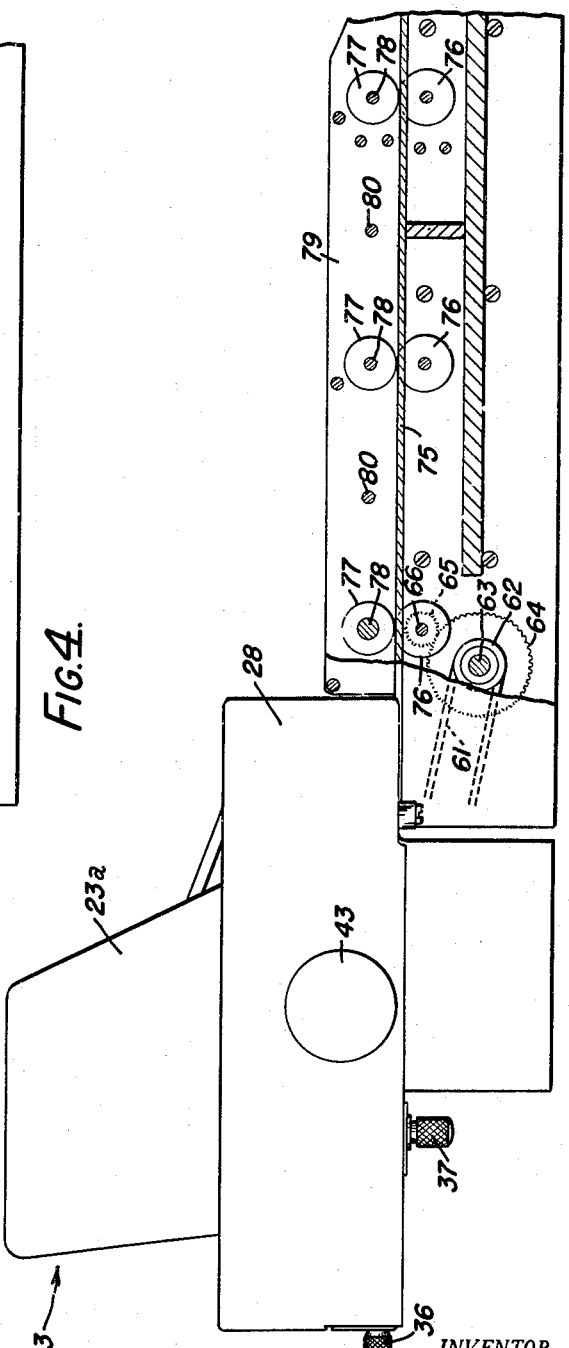
INVENTOR.
JOHN VANDERTUIN
AND WALTER B. PAYNE
BY
THEIR ATTORNEY

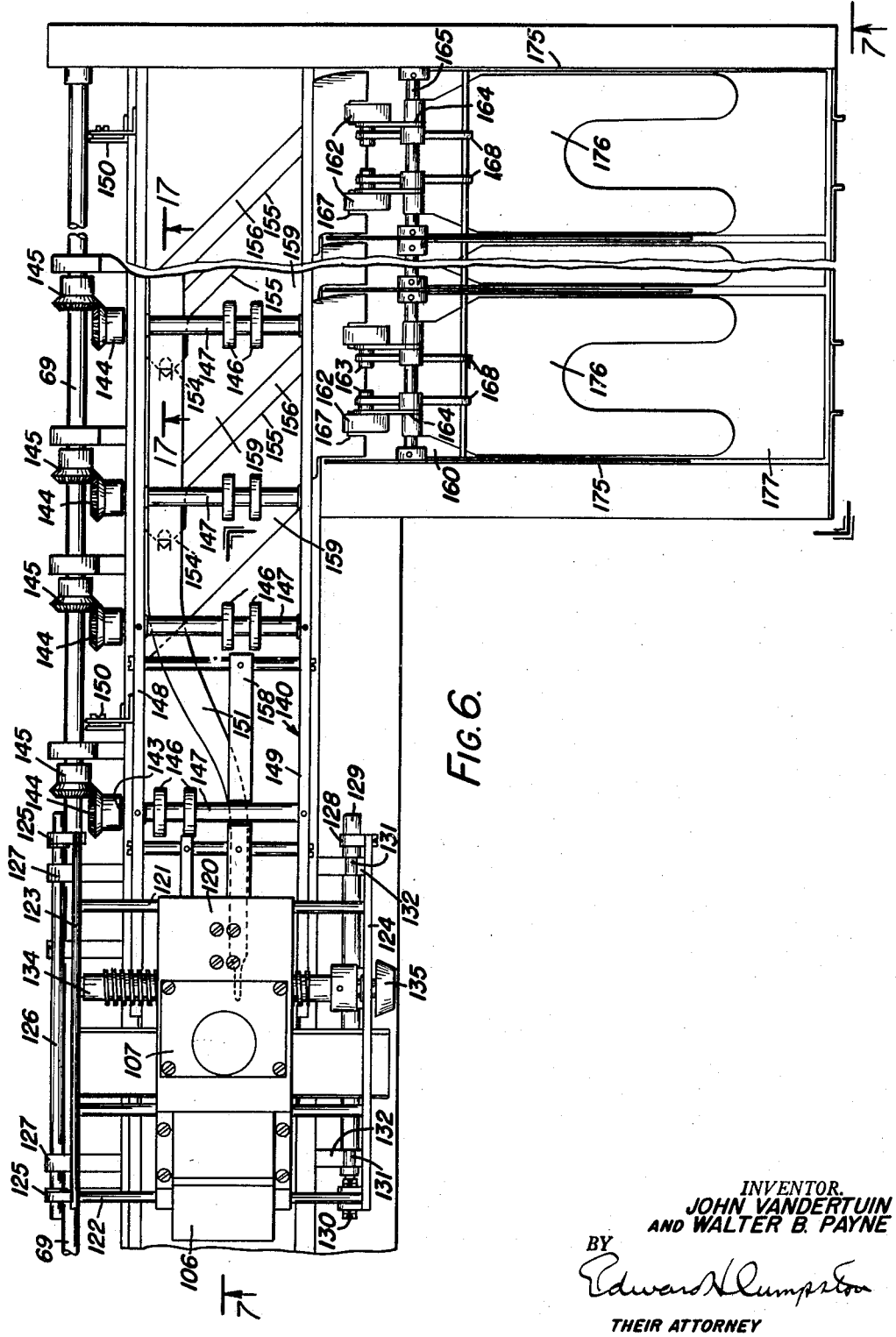

June 24, 1958
J. VANDER TUIN ET AL
2,840,237
MACHINE FOR SORTING RECORD FORMS
Filed Dec. 21, 1953
9 Sheets-Sheet 4
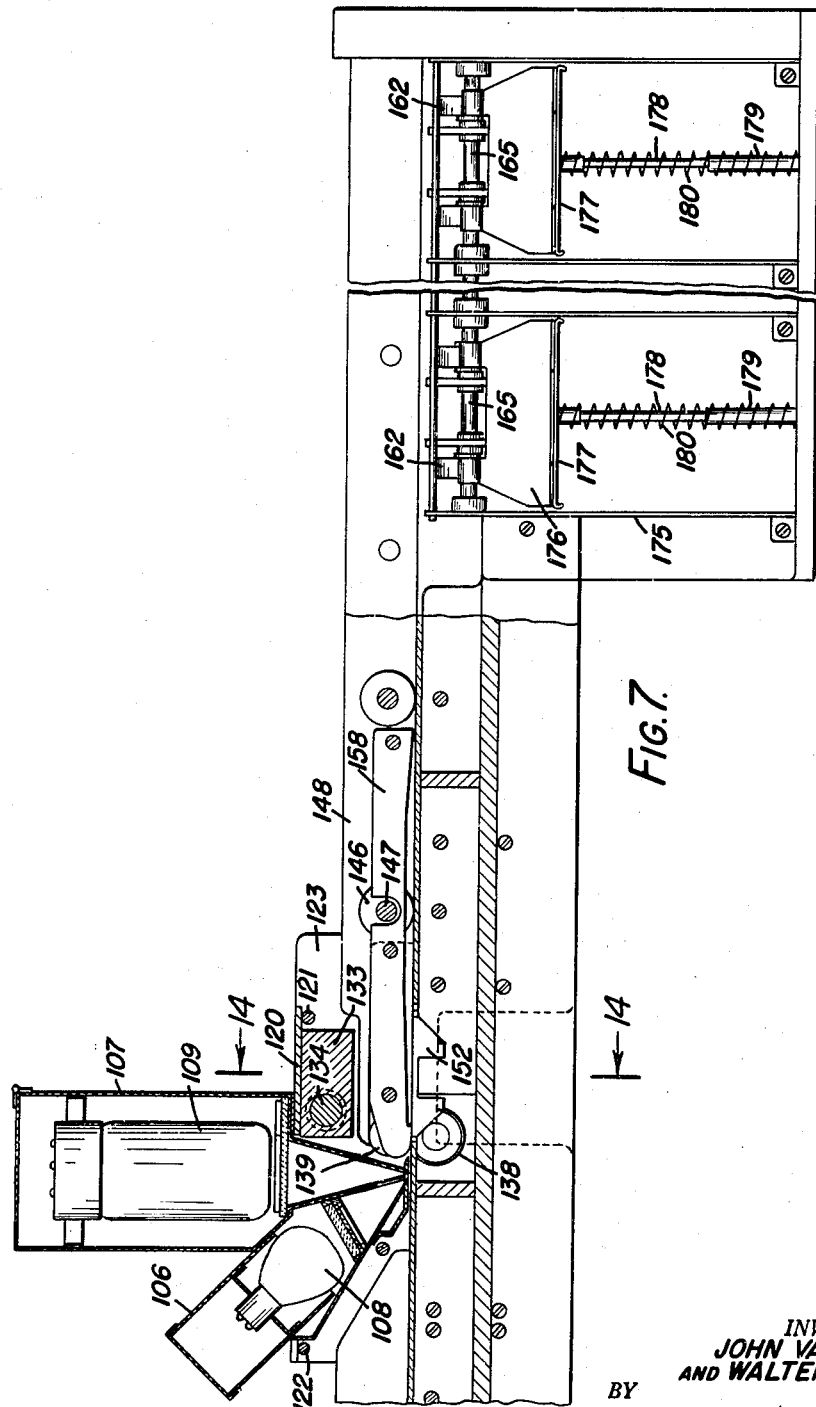
INVENTOR.
JOHN VANDERTUIN
AND WALTER B. PAYNE
BY
THEIR ATTORNEY

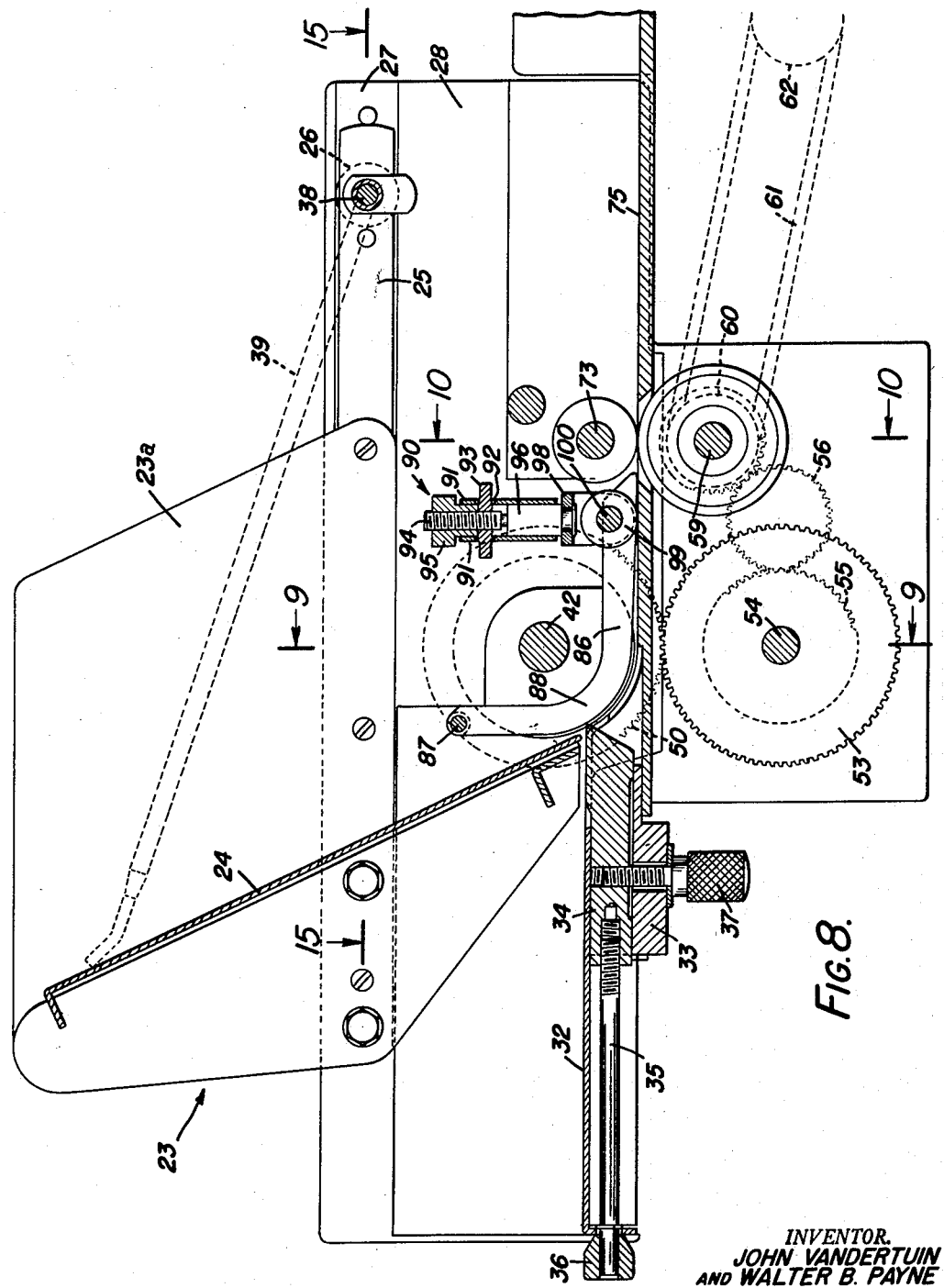

INVENTOR.
JOHN VANDERTUIN
AND WALTER B. PAYNE
BY
Edward H. Dumpston
THEIR ATTORNEY

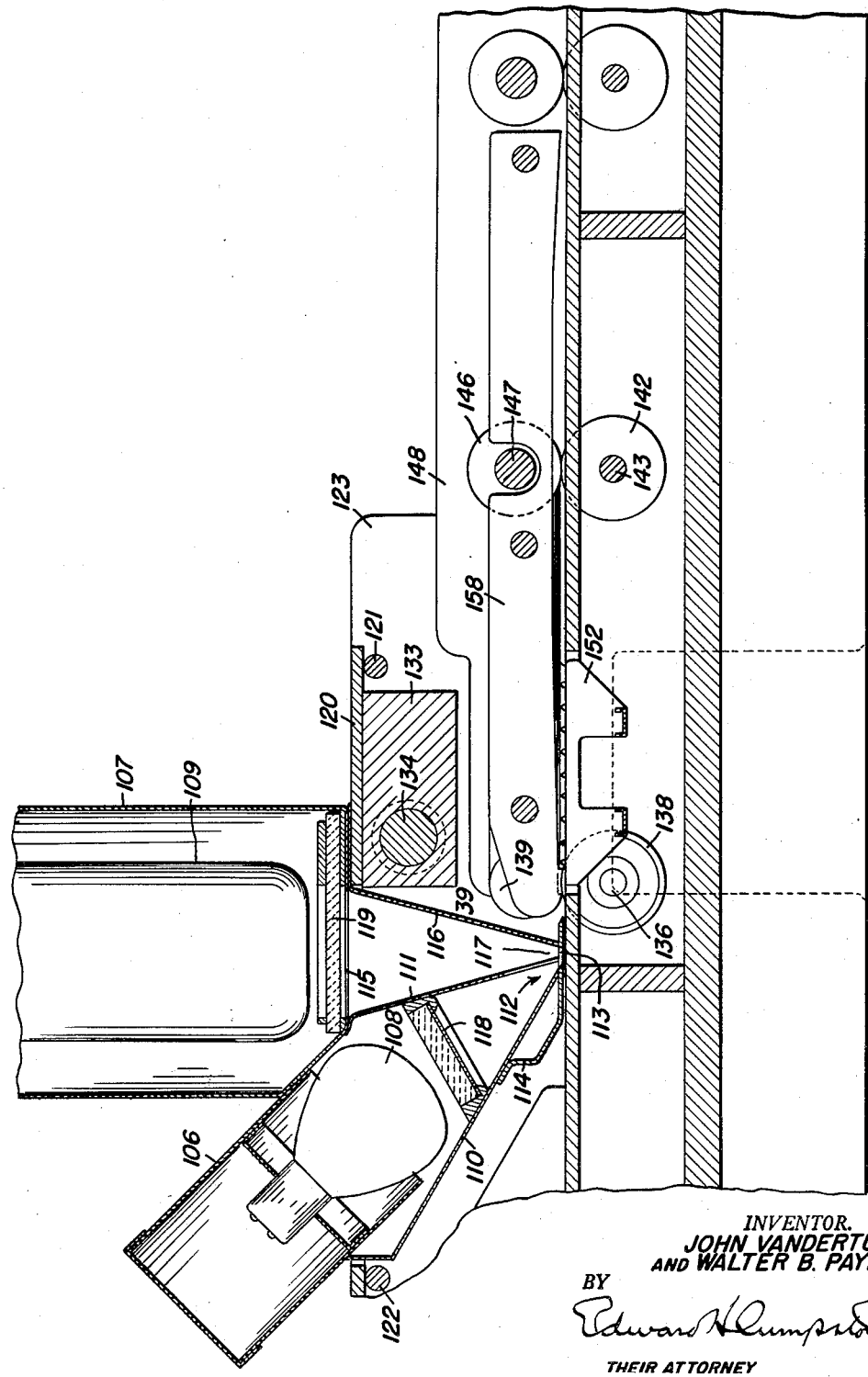

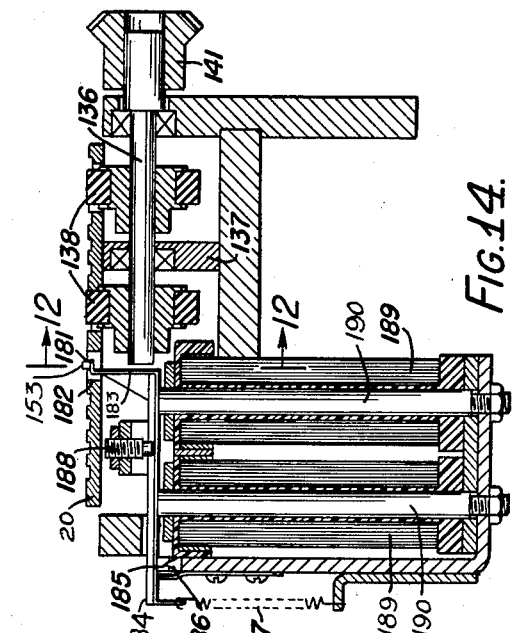
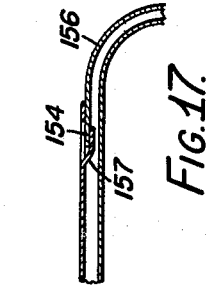
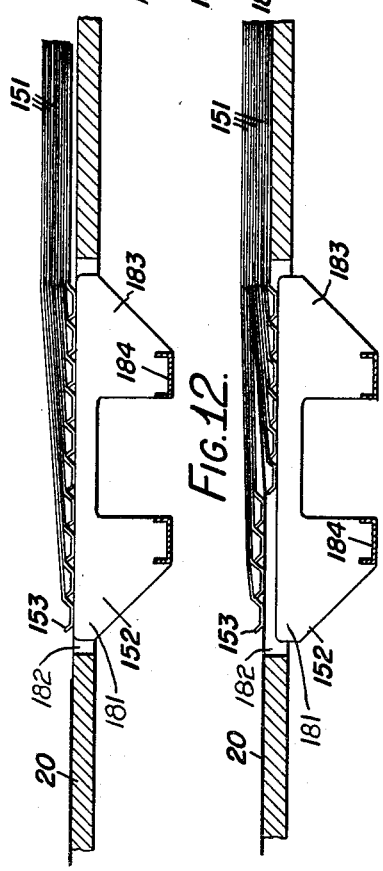
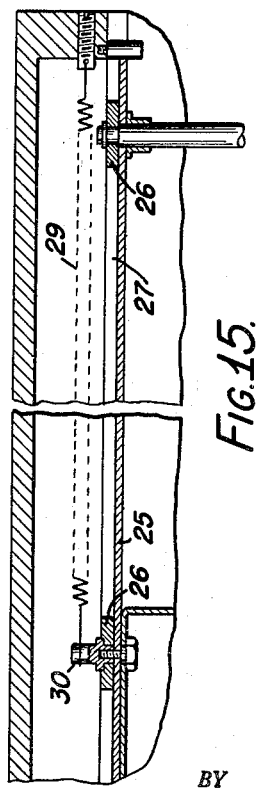

June 24, 1958 J. VANDER TUIN ET AL 2,840,237
MACHINE FOR SORTING RECORD FORMS
Filed Dec. 21, 1953 9 Sheets-Sheet 9

INVENTOR.
JOHN VANDERTUIN
AND WALTER B. PAYNE
BY
THEIR ATTORNEY

United States Patent Office 2,840,237
Patented June 24, 1958

2,840,237
MACHINE FOR SORTING RECORD FORMS

John Vander Tuin, Irondequoit, and Walter B. Payne, Rochester, N. Y., assignors, by mesne assignments, to Burroughs Corporation, Detroit, Mich., a corporation of Michigan Application December 21, 1953, Serial No. 399,555

7 Claims. (Cl. 209—111)

This invention relates to sorting machines and, more particularly, to those adapted for classifying or sorting sheets, cards, documents and similar commercial or business record forms, in accordance with code markings applied thereto.

It is a known practice to notch, punch or otherwise mark such forms in accordance with a predetermined code, to employ electrical sensing means for scanning such markings and to mechanically distribute the same to a plurality of receptacles or bins under selective control by such sensing means, but such practices have developed numerous difficulties. Thus forms subjected to manual handling, such as bank checks, often become deformed or crumpled so as to interfere with the mechanical feeding and sorting distribution thereof. The code marking by notching, punching or other mutilation of some forms such as bank checks is objectionable because of the resulting surface roughness and because tending to be mistaken for a sign of cancellation. Attempts have been made to overcome this difficulty by visibly printing the code marks on such forms, but this is also objectionable for the same reason. Resort has been made to normally invisible fluorescent markings activated by lamp means and scanned by sensing means employing light-sensitive cells, but such forms commonly involve substantial variations of color and other background surface characteristics tending to interfere with rapid and accurate scanning by means of such cells as heretofore commonly applied. Sorting mechanisms have been employed requiring the interruption of the feeding of the forms by stop means to facilitate scanning by the sensing means and in connection with the distribution to the different receptacles, thus retarding the speed of operation and complicating the construction. Prior machines, again, have commonly involved alteration of the relative arrangement of the forms of a stack so as to require subsequent manual or mechanical rearrangement to maintain convenient conformity with related records.

One object of the present invention, therefore, is to provide an improved sorting machine having more simple, practical and efficient principles of operation and construction avoiding the above disadvantages.

Another object is to provide a machine of such character capable of reliably handling forms which have become deformed or crumpled in use.

Another object is to supply a machine of this character adapted for use with forms having normally invisible markings printed or otherwise applied thereto without mutilation and including sensing means adapted for rapid and reliable sensing of the markings, independently of color or other surface characteristics of the backgrounds of the forms.

A further object is to provide a machine with such advantages and employing the positions of the moving forms themselves as a means of controlling the selective distribution of the forms to corresponding receptacles or bins.

A further object is to supply a machine of this character capable of sensing and selectively distributing the forms during continuous and rapid movement thereof through the machine.

A further object is to provide such a machine adapted for feeding the forms directly from the top of a supply stack in a rapid and accurate manner and depositing the same in the corresponding receptacles in the same original order as in the supply stack, so as to avoid the necessity for subsequent rearrangement.

Still a further object is to provide a machine having the above advantages in a construction capable of being readily and economically manufactured and maintained in satisfactory operating condition.

To these and other ends the invention resides in certain improvements and combinations of parts, all as will be hereinafter more fully described, the novel features being pointed out in the claims at the end of the specification.

In the drawings:

Fig. 1 shows a bank check with code markings of a variety adapted to be sorted by a machine embodying the present invention;

Fig. 2 is a perspective view of a machine embodying the present invention;

Fig. 3 is an end elevation of the same showing driving means;

Fig. 4 is a fragmentary, enlarged, top plan view of one end of the machine with parts broken away to illustrate feeding and driving portions;

Fig. 5 is a side elevation of the parts shown in Fig. 4 partly broken away and in section;

Fig. 6 is a view similar to Fig. 4, but of the opposite end of the machine and showing the sensing means and distributing gates and bins;

Fig. 7 is a side elevation of the parts shown in Fig. 6, broken away and partly in section on the line 7—7 in Fig. 6;

Fig. 8 is a view of parts shown in Fig. 5, but enlarged and in section on the line 8—8 in Fig. 4, to illustrate the receiving hopper and feeding means;

Fig. 11 is an enlarged, sectional elevation of parts shown in Fig. 7, partly on the line 7—7 in Fig. 6;

Fig. 12 is a fragmentary sectional elevation on the line 12—12 in Fig. 4, showing a form approaching the bin gates;

Fig. 13 is a view similar to Fig. 12 showing a gate opened and a form passing through;

Fig. 14 is an enlarged, sectional elevation on the line 14—14 in Fig. 7;

Fig. 15 is a fragmentary, sectional elevation on the line 15—15 in Fig. 8;

Fig. 16 is an enlarged, top plan view of the bin gates, detached and partly broken away;

Fig. 17 is a fragmentary sectional view on the line 17—17 in Fig. 6;

Figure 9:
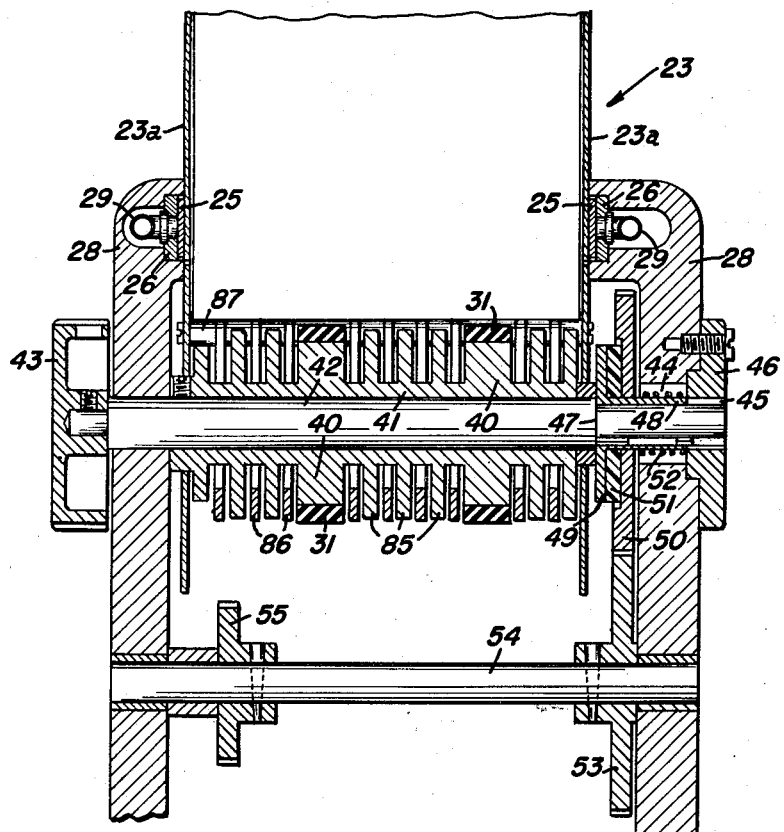
Fig. 9 is a sectional elevation on the line 9—9 in Fig. 8.

The invention is embodied in the present instance, by way of illustration, in a machine adapted for office use and preferably comprising frame means for supporting the various parts as shown in the several views, such frame means being enclosed within a housing or casing, as shown in Fig. 1 of the drawings and hereafter more fully described.

The invention is capable of use for sorting a wide variety of forms such, for example, as bank checks, provided with code markings, as illustrated by the check 20 shown in Fig. 1 of the drawings. Such markings may be employed to indicate a variety of classifications corresponding, for instance, to the name or location of the bank on which the check is drawn, its amount, its payroll or other nature, and the like, the code markings for each such classification being preferably spaced along a predetermined longitudinal line of the check, with the positions for the appropriate marking in each line at predetermined distances from each other and from the leading or right hand end of the check as it is fed through the machine. As shown in Fig. 1 a line for such markings is indicated at 21 which may be used to designate, say, the identity of the bank on which the check is drawn, or some category of the payment made, or the like, a single marking being shown at one of the possible positions in each line. The present machine is adapted for sorting checks in accordance with the positions of the markings in any such line in any one adjustment of the sensing means which is adjustable for operation at the different lines. Each of such markings, as shown, is preferably a small area marked with one of the normally invisible fluorescent materials of known composition such, for example, as "esculin," adapted to be irradiated by lamp means and scanned by light-sensitive cell means in the machine, as hereafter described.

The machine (Fig. 2) comprises generally a hopper at one end for receiving a stack of checks or other records to be sorted, and means for continuously feeding the checks from the top of the stack along a longitudinal pathway, past the sensing means and thence to means for distributing the checks to their respective bins. Such distributing means are controlled conjointly by the sensing means and by the location of the check as it moves along said pathway and, before reaching the bins, the check is turned over and deposited face down in its bin so as to preserve the same relative order or sequence of the checks as in the original stack, to thereby obviate the necessity for subsequent rearrangement in accordance with records in relation to which the checks may have been arranged in the stack.

Such hopper means for receiving a stack of checks to be sorted is indicated generally at 23 in Figs. 2, 4 and 5, and in detail in Fig. 8, comprising a hopper receptacle having side walls 23a and a rear wall 24, the side walls being fixed to rails 25 provided with rollers 26 running in channels 27 in opposite side walls 28 of the frame. Coiled tension springs 29 (Figs. 9 and 15) have their forward ends fixed to the frame at the forward ends of the channels and their rear ends fixed at 30 to studs on the hopper side walls, for yieldably urging the hopper forwardly toward rotary feed rolls 31 stationarily mounted on the frame, as hereafter described. The bottom portion of the hopper comprises a bottom plate 32 (Fig. 8) and spaced therebelow a guide plate 33 forming therebetween a guideway in which slides a hopper gate 34 for controlling the feeding of the forms individually from the stack by the feeding rolls 31. A pair of spindles 35 rotatably mounted on the bottom plate 32 have their outer ends provided with knobs 36 (Figs. 4, 5 and 8) and their inner ends threadedly engaged with gate 34, as shown, for adjusting it toward and from the feed rolls 31. Screws 37 extending through slots in guide plate 33 have threaded engagement with gate 34 for locking it in adjusted position, the gate being thus provided with means for precisely spacing its beveled forward end from the feed rolls and for securely locking it in adjusted position. A rod 38 connecting the side rails 25 of the hopper has a presser arm 39 pivotally mounted thereon so that the free end of the arm bears with its weight, or under the pressure of a light spring (not shown), against the uppermost check of the stack as it is progressively moved forwardly into contact with the feeding rolls, thus maintaining the checks in position in the stack.

Feed rolls 31 and their associated parts are shown generally in Fig. 4 and in detail in Figs. 8 and 9, preferably as rims of relatively soft rubber on flanges 40 fixed on or integral with a sleeve 41 rotatably mounted on a shaft 42 extending transversely of the path of feed. Shaft 42 (Fig. 9) extends at one end through a bearing in the side wall of the frame and has fixed thereon a knob 43 for turning it. The other end of the shaft passes freely through an enlarged opening 44 in the side wall of the frame and has a bearing 45 in a disk 46 fixed to the frame. Fixed on the end of the shaft between its bearing and a shoulder 47 thereon is a sleeve 48 having at its inner end adjacent the shoulder a radial flange 49. A driving gear wheel 50 is rotatably and slidably mounted on sleeve 48 and recessed on its inner side to receive a disk 51 of frictional material coextensive with flange 49. A compression spring 52 coiled about sleeve 48 bears at one end against disk 46 and at its other end against gear 50 to press the gear inwardly against the friction disk 51 and press the latter into engagement with flange 49 of sleeve 48, thus providing a yieldable frictional drive for shaft 42, to enable the shaft to be turned by knob 43 independently of the driving gear, to clear the machine of any accumulation of material, as well as for yielding cooperation with a second feeding means of higher speed as hereafter described.

Figure 10:
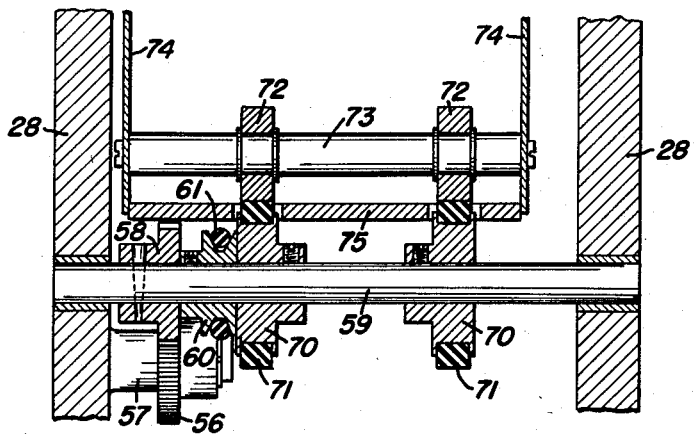
Fig. 10 is a sectional elevation on the line 10—10 in Fig. 8.

Gear 50 (Fig. 9) is driven by a gear 53 fixed on a transverse shaft 54 mounted at its ends in bearings in the frame and having fixed thereon a gear 55 meshing with a gear 56 (Figs. 8 and 10) rotatably mounted on a boss 57 on the side wall of the frame. Gear 56 meshes with and is driven by a gear 58 fixed on a transverse shaft 59 rotatably mounted at its ends in the frame side walls and having fixed thereon a pulley 60 driven by a belt 61 passing at its other end around a pulley 62 (Figs. 5 and 8), fixed on a shaft 63 rotatably mounted on the frame. Shaft 63 has fixed thereon a gear 64 meshing with a smaller gear 65 fixed on a shaft 66 (Figs. 4 and 5) rotatably mounted on and extending transversely across the frame. Shaft 66 is one of three such transverse shafts (Figs. 4 and 5) which are extended at one end through the side of the frame and provided with bevel gears, as 67, fixed thereon and meshing with similar gears 68 fixed on a driving shaft 69 extending along one side of the frame in bearings thereon.

Shaft 59 has fixed thereon a pair of feed rolls 70 (Fig. 10), each having a soft rubber rim 71 and these feed rolls engage cooperating idler rolls 72 rotatably mounted on a spindle 73 supported at its ends by frame portions 74. These feed rolls 71 and 72 of each pair are positioned as shown for engaging each other in the plane of the upper surface of a bed 75 of the machine frame and are positioned for engagement with the leading edge of a check or other form while being fed by contact at its intermediate portion with feed rolls 31, but the ratios of the gearing for driving rolls 71 and 72 are such that these rolls are driven at a faster rate of speed than feed rolls 31 so as to speed up the travel of each form along its pathway on bed 75, the rolls 31 at such time being driven at a faster speed by contact with the form as it is fed onwardly by rolls 71 and 72, such increased speed of rolls 31 being permitted by the frictional connection with their driving gear 50 as described above. This construction provides for spacing the forms from one another and for feeding them at a more rapid rate along their pathway through the machine.

Each driven feed roll shaft 66 has fixed thereon a pair of spaced feed rolls 76 each cooperating with an idler feed roll 77 rotating on a spindle 78 supported at its ends in the side walls of the frame, these feed rolls being driven at the same speed as rolls 71 and 72 to continue the feeding of the forms to the means for turning them over and depositing them in their respective bins. Spindles 78 are supported in side wall portions 79 connected by rods 80 forming a separate frame which is hinged at 81 to one side of the main frame so that it can be swung up for access to the bed of the machine.

Means are provided also in association with the hopper and feed rolls 31, for additionally smoothing any forms which may have become creased or crumpled in use, such means comprising a series of metal disks 85 (Figs. 4 and 9) fixed on the same sleeve 41 which carries the feed rolls 31. These disks have a diameter approximately equal to that of the yieldable feed rolls 31 while under compression, so that the disks engage the forms with a feeding and also an ironing and smoothing action as they are fed from the hopper. Additional means for this purpose are provided in a series of metal fingers 86 (Figs. 4, 8 and 9), pivotally mounted at one end on a spindle 87 supported at its ends in the side walls of the frame, these fingers having at their intermediate portions 88 a curvature substantially equal to that of the disks 85 so as to additionally smooth and hold the forms in flattened condition as they are fed forwardly through the machine.

Means are provided also for insuring the feed of the forms individually one at a time along the machine bed, preferably in the form of a thickness gauge indicated generally at 90 (Figs. 4 and 8). For this purpose a pair of spaced parallel plates 91 are fixed at their ends on the side walls of the frame beyond but adjacent the feed rolls 31, these plates being slotted at 92 and supporting between them a knurled disk 93 threadedly engaging and supporting a short spindle 94, and these parts being so arranged that manual rotation of the disk 93 serves to adjust spindle 94 to different vertical positions in which it is locked by a nut 95 thereon having an extension engaging disk 93. Spindle 94 bears at its lower end against a block 96 guided between the plates and carrying at its lower end below the plates a yoke 98 in which an idler roll 99 is rotatably supported on a pin 100, this roll being adjusted into close proximity with the machine bed 75, in accordance with the thickness of the individual forms, so as to stop the passage of more than one form at a time. In case any form passes the smoothing and feeding means described above in such condition as to become clogged in the feeding or gauging means, the machine may be stopped and knob 43 turned to rotate feed rolls 31 forwardly or backwardly for removing the deranged forms.

The sensing means for scanning the forms during their continuous movement along the machine bed are housed in a casing indicated generally at 105 (Fig. 2), enclosing a pair of transversely extending containers 106 and 107 (Figs. 6, 7 and 11), one containing ultra-violet lamp means 108 and the other light-sensitive cell means 109, of known and suitable varieties, as well understood in the art, for irradiating and sensing the fluorescent emission of the markings of the forms as they are fed continuously along the machine bed 75 by means hereafter described. Container 106 has its lower end constricted by laterally converging sides 110 and 111, the lower edges of which are spaced to provide a light projection slot 112 adjacent a corresponding slot 113 in a guide plate 114 fixed to and projecting downwardly from its lower side 110 and extending parallel with and slightly above the bed 75. Container 107 has its bottom formed with a light-receiving opening 115 and with an extension plate 116 inclined toward the side 111 of container 106 so as to converge therewith and form at the bottom thereof a light-receiving slot 117 registering with the slot 113 in plate 114.

It will be noted that while the axis and projection opening of lamp means 108 is inclined at an angle of, say, 45° with the machine bed, the axis and light-receiving opening of the cell means 109 extend normally to the machine bed. Since the light from lamp means 108 is incident upon a moving form at substantially less than normal direction and the angle of reflection of any such light from the surface of the form is equal to the angle of incidence of the light thereon, such reflected light is excluded from the normal extending axis of the cell, so that the latter is energized by only the light emanating from the fluorescent material of the form as a secondary source of light, independent of any reflectance from the surface of the form surrounding a marking. Lamp means 108 is preferably provided with a light filter, indicated generally at 118 (Fig. 11), of known and suitable construction, transmitting only ultra-violet light, at, say, 365 mu for activating the fluorescent material of the forms while cell means 109 is equipped with filter means 119 of known and suitable construction for transmitting only predetermined wave lengths of the fluorescent emission from the markings of the forms of, say, 540 mu. Lamp means 108 may obviously comprise one or any number of lamps while cell means 109 may comprise any suitable number of coordinated cells of the same sensitivity. It is apparent from this construction that while the forms may vary widely in their visible colorings, their light reflecting capacities and surface characteristics, the only light to which the cell means 109 is subjected is the predetermined wave lengths of fluorescent emission from a marking on the form as a secondary source of light. This arrangement has been found to materially increase the sensitivity and speed of the sensing means. Lamp 108 is included in circuit with a suitable source of power and cell 109 in circuit with amplifying, relay and accessory means of known character as well understood in the art, for operating the sorting bin gates as hereafter described; an example of a light-sensitive circuit that could be used would be one similar to that disclosed in U. S. Patent No. 2,593,206.

Containers 106 and 107 and their contents are together mounted upon a carriage 120 (Figs. 6, 7 and 11) provided with bearings for sliding transversely of the machine on spaced parallel rods 121 and 122 having their ends fixed in the side plates 123 and 124 and forming therewith a second carriage adjustable longitudinally of the machine. Plate 123 has laterally projecting arms 125 pivotally and slidably mounted on a side rod 126 supported in brackets 127 on the main frame, thus providing a hinge support at one side of the secondary carriage. The opposite side plate 124 has at one end a lug 128 slidably mounted on a longitudinal rod 129 on the main frame, while the opposite end of the plate is provided with nut means 130 threadedly engaged with the opposite end of rod 129. Rod 129 has reduced portions 131 resting in half bearings in arms 132 extending laterally from the main frame and it will be seen that the secondary carriage may be swung upwardly with its superposed carriage 120, about rod 126, for access to their under sides and to the bed of the machine. It is apparent from the above construction also that carriage 120 may be precisely adjusted longitudinally of the bed by turning its nut means 130.

Means are provided, in addition, for precisely adjusting the carriage 120 on its secondary carriage transversely of the machine bed, comprising a block 133 on carriage 120 (Figs. 7 and 11), threadedly receiving a spindle 134 rotatably mounted at its ends in the side plates of the secondary carriage and provided laterally with a turning knob 135. The scanning aperture 113 in plate 114 has approximately the size of one of the code markings of the form and by turning knob 135, the sensing means is adjusted transversely into registry with any line of such markings, as 21 or 22, extending longitudinally of the form. By adjusting nut means 130 of the secondary carriage, the aperture is precisely adjusted to the proper longitudinal distance from the bin gates to be operated by the sensing means conjointly with the simultaneous positions of the leading ends of the forms, as hereafter described.

The means for continued feeding of the forms past the sensing means and the bin gates and to the bins comprises preferably a transverse spindle 136 (Figs. 7, 11 and 14) located slightly beyond the sensing aperture and rotatably supported in bearings in one side wall of the frame and in an abutment 137 thereon (Fig. 14). The spindle has fixed thereon a pair of feed rolls 138 for cooperation with corresponding feed rolls 139 rotatably mounted on a spindle on a carriage 140 above the bed. Spindle 136 extends through the side wall of the frame and has fixed thereon a bevel gear 141 meshing with a bevel gear (not shown) on driving shaft 69. Feed rolls 138 extend through openings in the machine bed for engagement with rolls 139 in the plane of the bed, as shown, and these rolls are located closely adjacent the beginning of the bin gates.

Additional feed rolls 142 (Figs. 11 and 18) are fixed on transverse shafts 143 rotatably mounted in the side walls of the frame and with the rear end of each extended through the frame and provided with a bevel gear, as 144, these gears meshing with mating gears 145 on shaft 69. Feed rolls 142 project through openings in the bed of the machine and engage cooperating feed rolls 146 on spindles 147 mounted at their ends in the side plates 148 and 149 of carriage 140, these feed rolls being so located transversely of the bed, as shown, as to avoid interference with the gates and distributing means for the forms hereafter described. Carriage 140 has one side connected with the main frame by hinge means 150 so that it may be swung upwardly to expose the machine bed as in the case of carriages 79 and 120. Feed rolls 71, 76, 138 and 142 are all rotated at the same speed so as to move the forms rapidly and continuously to the means for distributing them into their respective bins.

Figure 18:
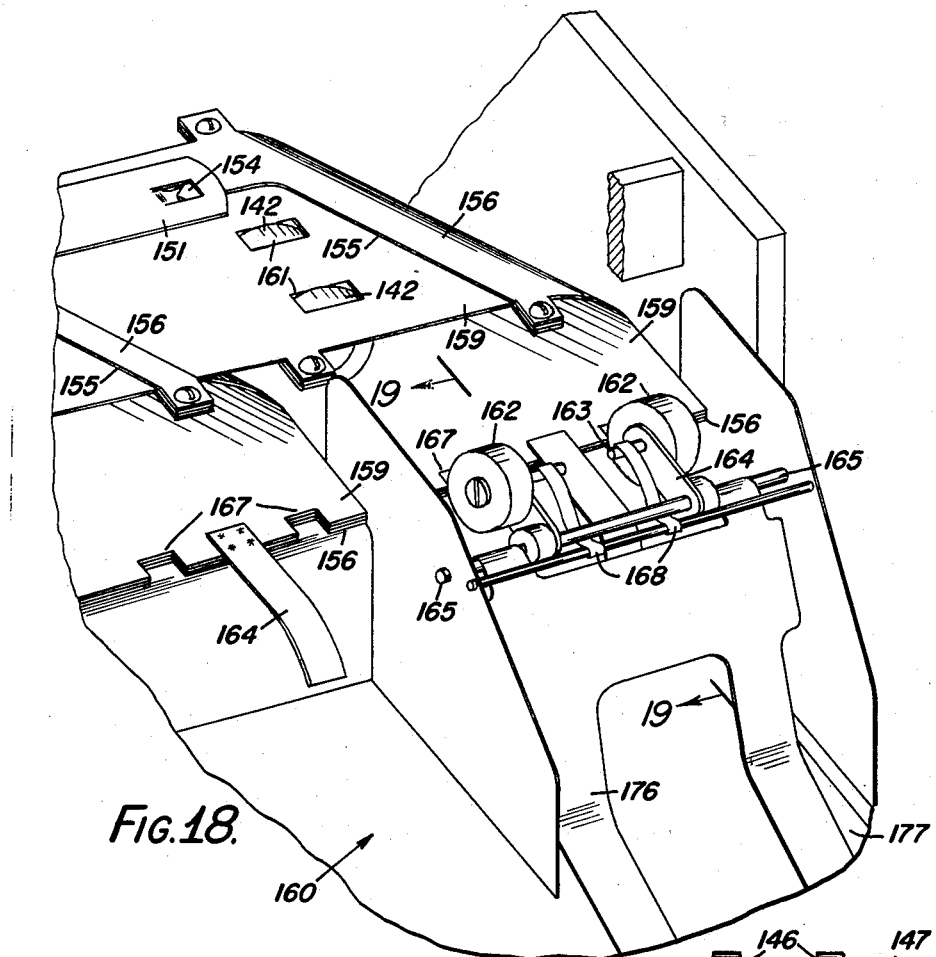
Fig. 18 is an enlarged, fragmentary, perspective view showing the means for turning and delivering the forms to the bins and the bin mechanism.

The bin gates are selectively actuated in a conjoint manner by the position of a form relative thereto as it is fed along the bed and by the above described sensing means including circuit means operated thereby, of the character hereafter described. The bin gates comprise elongated flexible strips or fingers 151 (Figs. 12, 13 and 16), superposed one above another and all normally supported at their free or movable ends upon a solenoid clapper means 152 in the sensing means circuit, as hereafter described. While supported by the solenoid clapper 152 as shown in Fig. 12, the upwardly inclined end 153 of each finger extends above the advancing end of a form 20 so that the form end enters between the gate ends and the upper surface of the solenoid clapper, as the form is fed along in the plane of the machine bed, thus holding above the form those gate ends under which the form has entered at the time the cell means 109 is energized. Each finger 151 is supported at its opposite end by engagement with a pointed projection 154 (Figs. 6, 17 and 18) on the forward edge 155 of the corresponding plate 156 forming part of the form turning and guiding means hereafter described. Projection 154 enters between the lower surface of the corresponding finger and a tongue 157 (Fig. 17) cut and turned downwardly from the finger so as to extend under the edge of the plate and guide the advancing end of the form under it. The fingers are constructed of resiliently flexible material and are preferably held in line with each other and pressed yieldably downwardly in contact with the solenoid clapper as described, by means of a bar 158 (Figs. 6 and 11) fixed on the carriage 140 and having a recessed under side embracing the edges of the gate fingers for holding them in line. Each plate 156 has an associated plate 159 in parallel spaced relation below it to form therebetween the guide passageway for a form passing under the associated finger 151, the entrance to this passageway being preferably inclined to the pathway of the form as shown. Plates 156 and 159 curve downwardly and laterally as shown in Fig. 18, so as to terminate above the corresponding bin 160. The plates are slotted as at 161 (Fig. 18) to afford contact between the feeding rolls 142 and 146 described above, and the feeding of a form is continued by these rolls until the forward end of the form is engaged between similar feed rolls located above the corresponding bin as hereafter described. It is apparent from this construction that as each form is deflected to the appropriate bin, it is turned over for deposit face downwardly in the bin, so as to maintain the forms, except for separation, in the same relative order as in the original stack.

Figure 19:
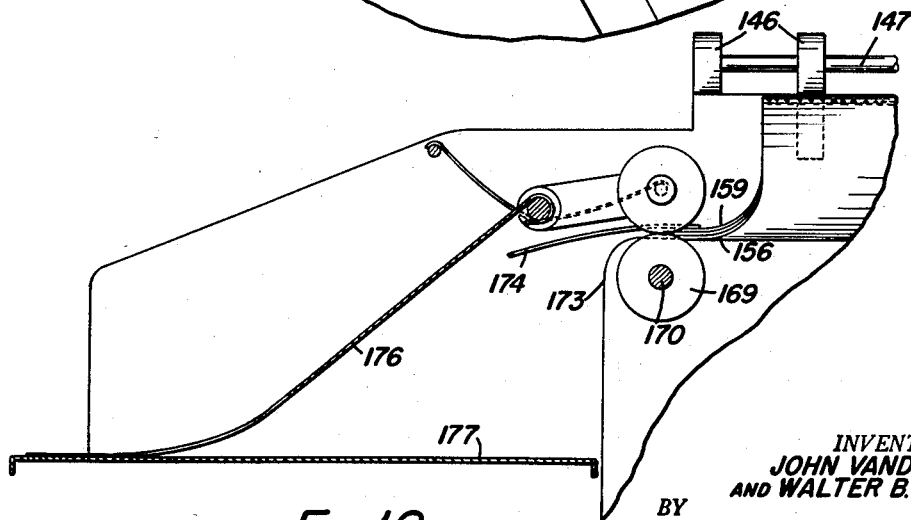
Fig. 19 is a sectional elevation on the line 19—19 in Fig. 18.

The means for continuing feeding of a form into its bin comprises preferably a pair of spaced idler feed rolls 162 on a spindle 163 carried by arms 164 pivotally mounted on a spindle 165 carried by bearings at its ends in the frame means. Rolls 162 operate in notches 167 in the terminal edges of the plates 156 and 159 and leaf springs 168 press them downwardly into contact with driving feed rolls 169 fixed on a shaft 170 extending longitudinally at the side of the machine and driven by chain or belt connection with the same motor 171 on the frame means for driving shaft 69, a single belt or chain 172 being preferably provided for this purpose, as shown in Fig. 3. As a form is advanced between the rolls 162 and 169, its leading edge travels above a guide plate 173 (Fig. 19) and below a guide strip 174 fixed on plate 159, so as to enter between the bin side walls 175 and beneath a downwardly extending, hold-down plate 176 pivoted on spindle 165 as shown. The forms are thus guided to fall upon a receiving table 177 yieldably supported in the bin. For this purpose, the table is fixed on one or more vertical rods 178, each slidably received in a guide tube 179, extending upwardly from the bottom of the bin, with a compression spring 180 coiled about the rod and tube below the table to yieldably support the table for gradual depression by the weight of the forms deposited upon it. By this means the forms are maintained in proper flat position, one upon another, as they are delivered into the bin.

The solenoid means for selectively positioning the bin gates comprises preferably the clapper 152 having a narrow horizontal keeper portion 181 (Figs. 12, 13 and 14), extending longitudinally in a slot 182 in the machine bed so as to contact the under sides of the ends 153 of the bin gates. This keeper portion 181 is carried by an upwardly extending flange 183 connecting the ends of spaced channel portions 184 extending laterally to one side of the machine bed. These channels are provided with notched means 185 mounted on knife edge means 186, to pivotally support the clapper for movement of its keeper portion 181 toward and from the surface of the machine bed and the ends of the bin gates. The clapper channels 184 are connected by tension coil spring means 187 with the frame (Fig. 14) for normally holding the clapper in raised position which is accurately determined by a stop screw 188 on the frame means.

The solenoid means for moving the clapper comprises a plurality of solenoids each including a winding 189 and a core rod 190, supported on the frame means, with the upper ends of the cores adjacent the clapper channels 184 for drawing the clapper downwardly against the tension of its spring means 187, to the lowered position shown in Fig. 13, so as to permit the lowering of those gate ends not held in raised position by the advancing end of the form as shown in Fig. 13. Such solenoid means is operated by circuit means including the sensitive cell means 109, with the known amplifying, relay and accessory devices commonly employed in such circuits, as well understood in the art, the particular details of which form no part of the present invention.

It is apparent from the above description that the forms are fed individually from the top of the stack in hopper 23 by continuously operating feeding means including devices for straightening and smoothing any forms which may have become crumpled or otherwise deformed in use. Such feeding means is yieldably driven to advance the leading end of a form into engagement with additional feeding means operating at a higher speed which pull the forms forwardly so as to space them from one another as they are advanced continuously along the bed past the light-sensitive means for scanning their code markings. Such scanning or sensing means is ingeniously arranged in such a manner as to be responsive solely to light rays emanating from the fluorescent markings as independent sources of light, thereby excluding any interference by light rays reflected from the surface of the forms. The positions of the scanning aperture and of the bin gates are so coordinated with the positions of the code markings relative to the leading edge of the form as to bring about the lowering of the gate supporting means at the instant at which the leading edge of the form has entered below the gate corresponding to its appropriate bin, thus holding this and the preceding gates elevated. At this instant, however, the operation of the solenoid means allows the remaining gates to fall so that the form is entered above the succeeding gates of the remaining bins. The gate finger immediately above the form guides it to the turning and feeding devices by which it is turned over and deposited face down in its bin in its original order relative to the forms delivered to the same bin, thus preserving any predetermined sequence of such forms and obviating subsequent rearrangement. The forms are thus accurately, rapidly and conveniently separated in accordance with a desired classification, ready for any further disposition in accordance therewith. This is accomplished by a combination and construction of parts affording a relatively simple, efficient and reliable machine, adapted for use with important economy of time, labor and expense in effecting such sorting operations.

It will thus be seen that the invention accomplishes its objects and while it has been herein disclosed by reference to the details of a preferred embodiment, it is to be understood that such disclosure is intended in an illustrative, rather than a limiting sense, as it is contemplated that various modifications in the construction and arrangement of the parts will readily occur to those skilled in the art, within the spirit of the invention and the scope of the appended claims.

1. In a machine for sorting paper forms provided with code markings of fluorescent material at different locations thereon, the combination of means for holding a stack of said forms, means for feeding said forms from said stack successively and continuously along a pathway in said machine, means comprising a container having an ultra-violet light source with a filter for selectively transmitting said light and arranged for irradiating said markings of forms on said pathway, a container having a light-sensitive cell with a filter for selectively transmitting predetermined wave lengths of fluorescent emission projected from said irradiated markings normally to the surface of a form on said pathway, means for adjusting said containers longitudinally and transversely of said pathway, a plurality of bins provided respectively with gates spaced along said pathway in accordance with the locations of said markings on said forms, and means controlled conjointly by said cell and a form on said pathway for opening a gate in advance of said form corresponding to the position of said irradiated marking thereon.

2. In a machine for sorting paper forms provided with code markings, the combination of means for holding and advancing a stack of said forms, means comprising a rotary feed roll for successively feeding the uppermost of said forms from said stack along a pathway in said machine, guide means curved and supported concentrically with said feed roll for smoothing crumpled forms in engagement therewith, means for engaging and moving said forms continuously along said pathway at a speed faster than that of said feeding means for spacing said forms along said pathway, electric means for sensing said marking of forms on said pathway, and a plurality of bins provided respectively with gates spaced along said pathway and controlled conjointly by said sensing means and a form on said pathway for opening a gate in advance of said form for depositing the same in a bin corresponding to said form marking.

3. In a machine for sorting paper forms provided with code markings located at different distances from the leading edges of said forms, the combination of a hopper provided with spring actuated means for holding and advancing a stack of said forms, means comprising a feed roll for successively feeding said forms from said hopper along a pathway in said machine, gate means on said hopper for controlling the supply of said forms individually to said feed roll, means comprising a thickness gauge for transmitting said forms individually from said feed roll and gate means along said pathway, electric means for sensing said markings of forms on said pathway, a plurality of bins provided respectively with gates spaced along said pathway to correspond with the locations of said markings on said forms, and means controlled conjointly by said sensing means and a form on said pathway for opening a gate in advance of said form for depositing the same in a bin corresponding to said form marking.

4. In a machine for sorting paper forms provided with code markings located at different distances from the leading edges of said forms, the combination of means for holding and advancing a stack of said forms, means for successively feeding said forms from said stack along a pathway in said machine, a plurality of pressing members associated with said feeding means and having curved surfaces for smoothing crumpled forms, electric means for sensing said markings of forms on said pathway, a plurality of bins provided respectively with gates spaced along said pathway in accordance with the locations of said markings on said forms, and means controlled conjointly by said sensing means and a form on said pathway for opening a gate in advance of said form for depositing the same in a bin corresponding to said form marking.

5. In a machine for sorting paper forms provided with code markings at different distances from the leading edges of said forms, the combination of means for holding a stack of said forms, means comprising a feed roll for successively feeding said forms from said stack along a pathway in said machine, means for yieldably rotating said feed roll at a predetermined speed, means for engaging forms fed by said roll and for moving the same along said pathway at a speed faster than that of said roll for spacing said forms along said pathway, electric means for sensing said markings during movement along said pathway, a plurality of bins provided respectively with gates spaced along said pathway to correspond with the locations of said markings on said forms, and means controlled conjointly by said sensing means and a form on said pathway for opening a gate in advance of said form for depositing the same in a bin corresponding to said form marking.

6. In a machine for sorting paper forms provided with code markings located at different distances from the leading edges of said forms, the combination of means for holding and advancing a stack of said forms, a feed roll for successively feeding the uppermost of said forms from said stack along a pathway in said machine, means for yieldably rotating said feed roll at a predetermined speed, pressing means associated with said roll for engaging and additionally smoothing crumpled forms engaged by said roll, means controlling the feeding of said forms individually along said pathway, means for engaging forms fed by said roll and moving the same along said pathway at a speed greater than that of said roll, electric means for sensing said markings of forms on said pathway, a plurality of bins provided with gates spaced along said pathway in accordance with the locations of said markings on said forms, means controlled conjointly by said sensing means and a form on said pathway for opening a gate in advance of said form for directing the same to a bin corresponding to said form marking, and means for turning said forms over during movement toward said bins for depositing the same in said bins in the same relative order as in said stack.

7. In a machine for sorting paper forms each provided with data markings on the face thereof, the combination of means for holding and advancing a stack of said forms in face uppermost position, means comprising a rotary feed roller for successively engaging and feeding the uppermost of said forms from said stack along a pathway in said machine, electric means for sensing said markings on the faces of said forms as they are fed along said pathway, a plurality of bins at the end of said pathway opposite said stack holding means, means controlled by said sensing means for selectively distributing said forms from said pathway to said bins in accordance with said markings, and means for individually turning over each of said forms subsequent to its passage through said sensing means so that each form is deposited in its respective bin face downwardly and in the same relative order as in said stack.

References Cited in the file of this patent

UNITED STATES PATENTS

| | | |
|---|---|---|
| 1,457,124 | Rinche | May 29, 1923 |
| 1,499,641 | Cox | July 1, 1924 |
| 1,985,035 | Kermode | Dec. 18, 1934 |
| 2,056,382 | Ayres et al. | Oct. 6, 1936 |
| 2,231,494 | Dickinson | Feb. 11, 1941 |
| 2,244,826 | Cox | June 10, 1941 |
| 2,609,928 | Doust | Sept. 9, 1952 |